United States Patent Office 3,190,923
Patented June 22, 1965

3,190,923
PROCESS FOR THE RECOVERY OF DIHYDRO-
PEROXIDE CONTENT FROM AQUEOUS ALKALI
EXTRACTION SOLUTION OF DIALKYLATED
AROMATIC HYDROCARBON OXIDATION REAC-
TION MIXTURES
Heinrich Sodomann, Bruno Hauschulz, and Meinloh
Hanke, Gladbeck, Westphalia, Germany, assignors to
The Distillers Company, Ltd., London, England, a
British corporation
No Drawing. Filed July 11, 1960, Ser. No. 42,179
Claims priority, application Germany, July 13, 1959,
P 23,142
5 Claims. (Cl. 260—610)

The present invention relates to a process for recovering the dihydroperoxide content from the organic reaction mixture resulting from the oxidation of dialkylated aromatic hydrocarbons and more particularly to the recovery of the dihydroperoxide content present in aqueous alkali solutions resulting from the extraction of said oxidation mixtures.

In the oxidation of dialkylated aromatic hydrocarbons, and more particularly dialkylbenzenes, such as diisopropylbenzene, with oxygen or air, the corresponding monohydroperoxides and dihydroperoxides are formed. In addition to these materials certain by-products are formed which may contain keto-groups or oxy-groups. There may also be formed during the oxidation small amounts of organic acids. For the subsequent production of dihydroxy aromatic hydrocarbon compounds, such as dihydroxy benzenes, it is essential to isolate the corresponding dihydroperoxides from the oxidation reaction mixtures in as pure a form as possible.

It is known to treat the oxidation reaction mixtures in this connection with alkali liquor, such as dilute aqueous alkaline solutions of from 1–12% concentration in order to extract the corresponding dihydroperoxide content. During this extraction, however, certain other constituents are taken up from the reaction mixture into the aqueous alkali phase, such as the corresponding monohydroperoxides and other oxidation by-products. In order to remove the monohydroperoxides and other oxidation by-products, the aqueous alkali solution, which may be, for example a dilute sodium hydroxide solution, is treated with conventional organic solvents which serve to extract the corresponding monohydroperoxides and organic oxidation by-products from the aqueous alkali phase. Generally, the organic solvent is the same material which is subjected to the oxidation reaction. Thus, where diisopropylbenzenes are used to form the corresponding dihydroperoxides, the same diisopropylbenzenes may be used as the organic solvents to extract the monohydroperoxides and oxidation by-products from the aqueous alkali solution. Other organic liquids which dissolve the undesired by-products and the monohydroperoxides, but do not dissolve the dihydroperoxides, especially under the temperatures used, are for example aromatic hydrocarbons such as benzene, toluene, xylene, isopropylbenzene etc. While higher temperature may be used to accomplish this extraction, these temperatures of necessity must be below the boiling point of the particular organic solvent applied.

In the remaining aqueous alkali solutions, the corresponding dihydroperoxide, such as diisopropylbenzene dihydroperoxide wherein diisopropylbenzene is subjected to oxidation, is substantially completely present in pure form. In order to recover the pure dihydroperoxide content, such as the diisopropyl benzene-dihydroperoxides, it has been suggested heretofore that the aqueous alkali solution be treated with carbon dioxide until the solution exhibits a pH value of about 9–10. In this manner, the substantial portion of the dissolved dihydroperoxide is precipitated and readily recovered.

Alternatively, it has been suggested that the aqueous alkali solution containing the dihydroperoxides, such as the diisopropyl benzene dihydroperoxides, be treated with certain organic solvents, such as ketones. It is necessary in this respect to employ about a 10–12 fold quantity of the organic solvent for treatment of the aqueous alkali solution in order to extract the dihydroperoxides, such as the diisopropylbenzene dihydroperoxides, in substantial quantity.

Obviously this procedure entails an extraordinary expenditure with respect to the quantities of organic solvent required as well as for the energy necessary in removing or separating these large solvent quantities from the desired dihydroperoxides. In accordance with this technique, the use of this large quantity or solvent for the extraction is conditioned upon the requirement found in practice that the extraction must be carried out at room temperature.

While it is known to use various organic solvents in the preliminary removal of the monohydroperoxide content and other oxidation by-products from the aqueous alkali phase at temperatures up to about 80 degrees C. wherein the substantial portion of the corresponding dihydroperoxides remains in the aqueous alkali phase; in contrast thereto, if it is desired to extract the corresponding dihydroperoxide content from the alkali solution with an organic solvent as aforementioned, this must be carried out in accordance with conventional techniques at room temperature. The desired effect nevertheless is only obtained if the solvent is used in considerable excess. It has not been recognized heretofore that the use of increased temperatures during the extraction would be advantageous since it was always considered that higher temperatures would result in undesirable decomposition of the dihydroperoxide.

It is an object of the present invention to overcome the foregoing disadvantages and to provide a process for recovering the dihydroperoxide content from the organic reaction mixture resulting from the oxidation of dialkylated aromatic hydrocarbons by employing insoluble organic liquid extraction component at higher temperatures for extracting the aqueous alkali phase. Other and further objects of the invention will become apparent from a study of the within specification.

It has been found in accordance with the present invention that the corresponding dihydroperoxide content may be readily and efficiently recovered from the organic reaction mixture resulting from the oxidation of dialkylated aromatic hydrocarbon wherein the reaction mixture includes the corresponding mono-hydroperoxide and other oxidation by-products in addition to the dihydroperoxide by treating the reaction mixture with aqueous alkali to extract the dihydroperoxide, treating the resulting aqueous alkali phase containing these dihydroperoxides with an organic solvent in a preliminary extraction step to remove attendant impurities including the monohydroperoxide and other oxidation by-products, and thereafter removing the dihydroperoxide from the remaining aqueous alkali phase by extracting said phase with an organic liquid extraction component at elevated temperatures, which is practically insoluble in water and practically immiscible with water.

The dehydroperoxide content is conveniently recovered from the water insoluble organic liquid extraction component by distillation. Suitably, the water insoluble organic liquid extraction component, upon distillation, may be recycled for the further extraction of the aqueous alkali phase. In the same way, the aqueous alkali phase, upon extraction with the water insoluble organic liquid extraction component may be recycled for further extraction of the reaction mixture.

In accordance with the preferred embodiment of the invention, the aqueous alkali phase and the water insoluble organic liquid extraction component are present in a ratio of about 1:1 by weight. Generally, ratios of 0.2:1 to 5:1 by weight of the aqueous alkali phase to the organic liquid are possible. The temperature employed during the extraction is generally within the range of from about 30 to 100 degrees C. and more particularly from about 75 to 85 degrees C.

Specifically, after the reaction mixture resulting from the oxidation of dialkylated aromatic hydrocarbon has been treated with aqueous alkali to extract the dihydroperoxide content and the aqueous alkali is in turn treated with an organic solvent in a preliminary extraction step to remove the corresponding monohydroperoxide and other oxidation by-products carried over with the dihydroperoxide from the reaction mixture into the aqueous alkali solution, the aqueous alkali which now contains substantially completely the dihydroperoxide content is treated with a water insoluble organic liquid extraction component, preferably at a temperature from 75 to 85 degrees C. wherein the aqueous alkali and water-insoluble organic liquid extraction components are present in the said ratios, especially in the preferred ratio of about 1:1, and the dihydroperoxide is recovered in the water-insoluble organic liquid extraction component. Upon distillation, the desired dihydroperoxide is obtained in substantially pure form.

The dialkylated aromatic hydrocarbon may be defined in terms of the following formula:

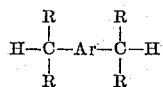

wherein R is an alkyl group and Ar is an aromatic radical such as phenyl. The alkyl radical may be a straight chain or branched chain alkyl radical. Such compounds to be subjected to the oxidation reaction in accordance with the invention include dialkylated benzenes such as diisopropyl benzenes.

In accordance with the present invention substantially smaller quantities of water insoluble organic liquid extraction components may be used as organic solvents for the dihydroperoxide than were required heretofore for the extraction of the aqueous alkali phase. Furthermore, the organic solvent or water insoluble organic liquid extraction component may be used at an extraction temperature limited only by the boiling point of the components such as that of the aqueous alkali solution. It is preferred that a temperature between about 70 to 100 and more particularly 75 to 85 degrees C., be employed as well as a ratio of aqueous alkali to water insoluble organic liquid extraction component of about 0.2 to 5:1 since these conditions permit an extraction of 75% and more of the corresponding dihydroperoxide in one operation. In this connection, it will be appreciated that by using smaller quantities of the organic solvent or liquid extraction component a saving in material will be afforded as well as a saving in energy requirements in the subsequent recovery of the dihydroperoxide therefrom, such as, for instance, by distillation.

While it is true that dihydroperoxides of the foregoing kind may undergo decomposition at higher temperatures which may result in a slight loss of the dihydroperoxide content, this loss is comparatively negligible when compared with the advantageous efficient recovery of the main portion of the dihydroperoxide using less extraction component and less energy in recovering the dihydroperoxide therefrom as for example by distillation. The losses in this regard are essentially below about 2% of the existing dihydroperoxide quantity.

In accordance with the preferred embodiment of the present invention, the aqueous alkali solution, after extraction with the water-insoluble organic liquid extraction component, which still contains minor portions of dihydroperoxide may be advantageously recycled for extraction of the oxidation reaction products. There is no need to further extract this small remaining quantity of dihydroperoxide from the aqueous alkali solution. Thus a cycle of dihydroperoxide is set up with respect to the aqueous alkali solution which has no disturbing influence upon the various steps being carried out. It will be appreciated that in this manner of operation practically no aqueous alkali solution losses occur due to the fact that the aqueous alkali solution is recycled from step to step, i.e., extraction of the oxidation reaction mixture, preliminary extraction of impurities by organic solvent and extraction of the dihydroperoxides by the water insoluble organic liquid extraction component. In the same manner as described above, the water insoluble organic liquid extraction component may be separated from the dihydroperoxide by distillation and recycled for further extraction of the aqueous alkali solution.

Among the water-insoluble organic liquid extraction components which may be used in accordance with the present invention and which can selectively dissolve in an appreciable amount the dihydroperoxides are oxygen-containing and halogen-containing hydrocarbons. In particular, the water insoluble organic liquid extraction components include aliphatic ketones, such as methyl-ethyl ketone, methyl-propyl ketone, methyl-iso-butyl ketone, and the like; aliphatic ethers such as diethyl ether, di-isopropyl ether, and the like; chlorinated aliphatic hydrocarbons, such as carbon tetrachloride and the like; and aliphatic alcohols such as butanol, pentanol, and the like.

It will be appreciated that the foregoing compounds are preferably water-insoluble in order to effect efficient extraction of the aqueous alkali solution. The ratio of aqueous alkali to the water-insoluble organic liquid extraction component may be 1:1 by weight in a preferred embodiment of the invention and in this connection, the amount of water-insoluble organic liquid extraction component may be even less than 1.

*Examples*

(1) m-Diisopropyl benzene was oxidized at a temperature of 105° C. with molecular oxygen. The formed dihydroperoxide was obtained by extraction with a 5% aqueous solution of sodium hydroxide. The by products enriched in the aqueous solution were separated by a 5-stage-extraction of the solution with benzene. The obtained alkali solution showed a content of dihydroperoxide of 5.8 grams. 100 grams of this solution were at a temperature of 80° C. extracted with methyl isobutyl ketone in a ratio of 1 part by weight alkali solution to 0.75 part by weight ketone. After the extraction the organic phase contained 4.7 grams of dihydroperoxide which corresponds to 81% of the dihydroperoxide charged.

If the extraction temperature is 20° C., the other conditions of the example being the same as described above, the organic phase contains 0.93 g. dihydroperoxide which corresponds to 16.1% of the dihydroperoxide charged.

(2) A 5% aqueous solution of sodium hydroxide containing by products of the oxidation (including some m-diisopropylbenzene monohydroperoxide) and m-diisopropyl benzene dihydroperoxide was extracted with benzene as described in Example 1. Now the obtained solution was subjected to a 5-stage-counter-current extraction with methyl isobutyl ketone at a temperature of 70° C. The ratio of the solution to the ketone was 1:0.75. There were obtained 5.62 grams of dihydroperoxide from the 5.8 grams dihydroperoxide charged with corresponds to a yield of 97%.

(3) A 5% aqueous solution of sodium hydroxide obtained by extraction of an oxidation reaction mixture of p-diisopropyl benzene contained 5.2 grams p-diisopropyl benzene dihydroperoxide and several by products (including some monohydroperoxide). The separation of the by products was carried out as described in Example 1. After extraction with methyl isobutyl ketone at a temperature of 70° C. and with a ratio of solution to ketone of 1:1.2 there were obtained an organic phase with a dihydroperoxide content of 4.45 grams, which corresponds to 85.7% of the dihydroxyperoxide charged.

If the extraction is carried out at a temperature of 20° C., the other conditions being the same as described above, an organic phase was obtained with a dihydroperoxide content of 0.69 grams which corresponds to only 13.3% of the dihydroperoxide charged.

We claim:

1. In the process for recovering the dihydroperoxide content from the organic reaction mixture resulting from the oxidation of dialkylated aromatic hydrocarbons wherein said reaction mixture, including the corresponding monohydroperoxide and other oxidation products in addition to the dihydroperoxide, is treated with aqueous alkali to extract said dihydroperoxide from such reaction mixture, and the resulting aqueous alkali phase is treated with an aromatic hydrocarbon as organic solvent to extract the monohydroperoxide and other oxidation products therefrom while leaving the dihydroperoxide therein, the improvement of treating the aqueous alkali phase containing the dihydroperoxide, and from which the monohydroperoxide and other oxidation products have been removed, with a water-insoluble organic liquid extraction component selected from the group consisting of aliphatic ketones, aliphatic ethers, aliphatic alcohols and chlorinated aliphatic hydrocarbons, at a temperature of from 70–100° C. and in a ratio of extraction component to alkali phase of 0.2–5:1, to extract said dihydroperoxide from said alkali phase.

2. Improvement according to claim 1 wherein said dihydroperoxide is a product of the oxidation of a dialkylated aromatic hydrocarbon of the formula:

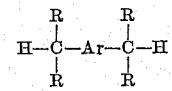

wherein R is an alkylated group and Ar is an aromatic radical, said aqueous alkali phase upon extraction with said extraction component being recycled once more for further extraction of the reaction mixture and, upon distillation, the extraction component being recycled to the extraction of said alkali phase.

3. Improvement according to claim 1 wherein the temperature is maintained at from about 75–85° C. and the ratio of extraction component to alkali phase is maintained at about 1:1, the dihydroperoxide being recovered from said extraction component by distillation.

4. Improvement according to claim 1 wherein the dialkylated aromatic hydrocarbon is a dialkyl-substituted phenyl compound and the dihydroperoxide is the corresponding dihydroperoxide thereof.

5. Improvement according to claim 4 wherein the dialkylated aromatic hydrocarbon is diisopropylbenzene, the aqueous alkali used is dilute sodium hydroxide solution, and the organic solvent is methyl isobutylketone.

References Cited by the Examiner
UNITED STATES PATENTS 2,856,432   10/58   Conner et al. _____ 260—610

FOREIGN PATENTS 743,736   1/56   Great Britain.

LEON ZITVER, *Primary Examiner.*

CHARLES B. PARKER, *Examiner.*

UNITED STATES PATENT OFFICE
CERTIFICATE OF CORRECTION

Patent No. 3,190,923　　　　　　　　　　　　　　　　June 22, 1965

Heinrich Sodomann et al.

It is hereby certified that error appears in the above numbered patent requiring correction and that the said Letters Patent should read as corrected below.

Column 6, line 7, for "alkylated" read -- alkyl --.

Signed and sealed this 21st day of December 1965.

(SEAL)
Attest:

ERNEST W. SWIDER　　　　　　　　　　　　　　　　EDWARD J. BRENNER
Attesting Officer　　　　　　　　　　　　　　　　　Commissioner of Patents